United States Patent [19]
Olsen

[11] Patent Number: 5,324,236
[45] Date of Patent: Jun. 28, 1994

[54] CONTROL MECHANISM FOR TOROIDAL-TYPE TRANSMISSIONS

[76] Inventor: William K. Olsen, 247 Falls Creek Dr., Bellvue, Colo. 80512

[21] Appl. No.: 27,389

[22] Filed: Mar. 8, 1993

Related U.S. Application Data

[62] Division of Ser. No. 699,978, May 13, 1991, Pat. No. 5,256,110.

[51] Int. Cl.$^5$ ............................................. F16H 15/00
[52] U.S. Cl. .................................................... 474/69
[58] Field of Search ....................... 474/69, 68, 56, 61; 74/191, 193

[56] References Cited

U.S. PATENT DOCUMENTS 2,124,399  7/1938  Hayes .
4,499,782  2/1985  Perry .
4,885,949  12/1989  Barber .

*Primary Examiner*—Thuy M. Bui

[57] ABSTRACT

A toroidal-type power transmission device in which pivoting drive wheel assemblies (5 and 6), comprised each in part of a drive wheel (15) and frictional ring (18), transmit rotational power from a driving toroidal race (1) to a driven toroidal race (2). For each pivoting drive wheel assembly (5 and 6), a drive wheel (15) is rotatably attached to a holding frame (19), such that each drive wheel (15) is permitted substantially free rotation about a respective axle (17). One end of a holding frame (19) is rotatably attached with a control shaft (20) to a mounting structure (10). The opposite end of the holding frame (19) is rotatably attached with a control shaft (21) to a mounting structure (9). The drive wheel (15) and holding frame (19) can therefore pivot as a unit about an axis situated through control shaft (20) and control shaft (21). A driving toroidal race (1) is fixedly attached to a driving shaft (3). The driving shaft (3) is rotatably attached to a mounting structure (12). A driven toroidal race (2) is fixedly attached to a driven shaft (4). The driven shaft (4) is rotatably attached to a mounting structure (13). Engaged semi-cogs (7 and 8) are fixedly attached to the control shafts of the pivoting drive wheel assemblies (5 and 6). In operation, a control lever (14), fixedly attached to a semi-cog (8), is actuated to pivot the drive wheels to a selected drive ratio. The active drive ratio is determined by the position of the drive wheels as they contact the driving toroidal race (1) and driven toroidal race (2). This device therefore provides an infinite selection of drive ratios within the range of drive ratios provided by the particular dimensions of such a device. The transition from one drive ratio to another drive ratio is smooth and continuous. The pivoting control of the drive wheels is accomplished in unison by the engaged semi-cogs (7 and 8), a mechanism that is much simpler and less cumbersome than pivoting controls on other toroidal-type transmissions.

7 Claims, 8 Drawing Sheets

CONTROL MECHANISM FOR TOROIDAL-TYPE TRANSMISSIONS

This is a division of Ser. No. 07/699,978, Filed May 13, 1991. Now U.S. Pat. No. 5,256,110

FIELD OF THE INVENTION

The present invention relates to manual and automatic multi-ratio and infinite-ratio toroidal drives or transmissions for use on bicycles, motorcycles, other motor vehicles or any other devices wherein a toroidal-type or similar drive is required or desirable.

DESCRIPTION OF RELATED ART

There are many applications that benefit from the ability to change drive ratios. Increasing the number of available drive ratios, providing for a continuous, or stepless, ratio transition, and applying automatic control to optimal ratio selection have each long been sought as goals in further improving mechanical efficiency and convenience. In the past, however, these goals have been sought with devices that increase weight or cost, or are so complex and unwieldy that practical use is not attainable.

There is a long history of development of continuously-variable transmissions, and within the art there has been particular concentration on toroidal-type drives. Races or formed surfaces partially envelope a torus void, within which are located one, two, or more pivoting drive wheels or rollers. The drive wheels transmit motion between the torus surfaces. The pivoting drive wheels, when actuated in unison, alter the ratio of input to output revolutions. The shifting is generally smooth and continuous within the ratio range designed into a specific drive. Within a given ratio range there is an infinite selection of drive ratios. Much early work and reference can be found in the work of F. A. Hayes, including such patents as U.S. Pat. Nos. 1,698,229 (Jan. 8, 1929); 1,856,249 (May 3, 1932); 1,865,102 (Jun. 28, 1932); 1,867,149 (Jul. 12, 1932); 1,919,218 (Jul. 25, 1933); and 2,124,399 (Jul. 19, 1938), among others. A consistent problem addressed by these and other patents is control of the pivoting drive wheels. Specifically, there have been many examples of complex lever and sliding-lever mechanisms, as seen for example in Hayes U.S. Pat. No. 1,698,229 (Jan. 8, 1929); Hayes U.S. Pat. No. 2,124,399 (Jul. 19, 1938); and in Edlich U.S. Pat. No. 2,353,448 (Jul. 11, 1944). Demonstrated in the prior art are numerous methods of direct pivoting control by complex hydraulicactuators, including Perry U.S. Pat. No. 4,499,782 (Feb. 19, 1985) and Barber U.S. Pat. No. 4,885,949 (Dec. 12, 1989). The problem has been that the resulting drives have complicated the simple concept of the toroidal drives by requiring many complex and often heavy and cumbersome parts for placement and control of the pivoting drive wheels. The complexity and bulkiness of the drive wheel controls often place direct limitations on the size and span of the toroidal races, limiting ratio range and increasing costs of manufacturing and maintenance.

What is needed, therefore, is a simple mounting and control mechanism for toroidal-type drives that reduces the complexity and bulkiness of the drives. Simplified control and manufacture, and associated reduced costs, have the potential to improve the economic feasibility of using continuously variable transmissions of the toroidal type on a large scale in many applications, including but not limited to vehicles, turbines, machine tools and many other devices.

SUMMARY OF THE INVENTION

It is an object of the present invention to provide a continuous infinite-ratio power transmission device that is readily adaptable to a wide variety of vehicles and devices wherein an infinite-ratio drive is required or desirable.

Another object of the present invention is to provide a continuous infinite-ratio power transmission device that changes drive ratios rapidly and smoothly.

It is a further object of the present invention to provide a method for pivoting of the drive wheels in a toroidal-type continuous infinite-ratio power transmission device that is simple in design and construction, easy to maintain and relatively light in weight.

Other objects and attendant advantages of the present invention will readily be perceived hereafter.

The present invention relates in part to a drive wheel, the circumference of the drive wheel being partially embedded with a frictional ring. The drive wheel is able to rotate about an axle, the drive wheel and the axle held in place by a holding frame that is permitted to pivot as a unit. The unit's pivot orientation is about a secondary axis located on a plane bisecting the length of the drive wheel axle. The secondary axis is also located at a right angle to the center of the drive wheel axle. Two such drive wheels are driven by a driving toroidal race and drive a driven toroidal race. The driving toroidal race is fixedly attached to a driving shaft, and the driven toroidal race is fixedly attached to a driven shaft. The axis of each shaft is set such that when the frictional rings of the drive wheels make contact with the smallest circumference of the driving toroidal race, the frictional rings on the opposite sides of the drive wheels are in contact with the largest circumference of the driven toroidal race, providing for a low drive ratio. Conversely, when the frictional rings of the drive wheels make contact with the largest circumference of the driving toroidal race, the frictional rings on the opposite sides of the drive wheels are in contact with the smallest circumference of the driven toroidal race, providing for a high drive ratio. The pivoting of the drive wheel and axle units about the secondary axis described above permits any drive ratio between and including the two aforementioned extreme ratios to be selected, such selection being infinite and continuous within the range of the upper and lower drive ratios. Further, each of twosemi-cogs are fixedly attached to a respective control shaft of each drive wheel unit; the two semi-cogs are mounted and engaged external to the toroidal void created by the toroidal races. Drive ratios are changed relative to the change in the point of contact between the driven wheels' frictional rings and the driving and driven toroidal races, such change taking effect by the intended movement of the semi-cogs, in turn caused by an intended movement of a control lever fixedly attached to a semi-cog.

Other details and features of the present invention will be apparent to those skilled in the art based upon the following detailed description, taken in combination with the accompanying drawings.

DETAILED DESCRIPTION OF THE INVENTION

The preferred embodiment is not intended to be exhaustive or to limit the invention to the precise form disclosed. It is chosen and described in order to best explain the principles of the invention and its application and practical use to thereby enable others skilled in the art to best utilize the invention.

A PREFERRED EMBODIMENT—FIGS. 1 TO 8

Figure 1:
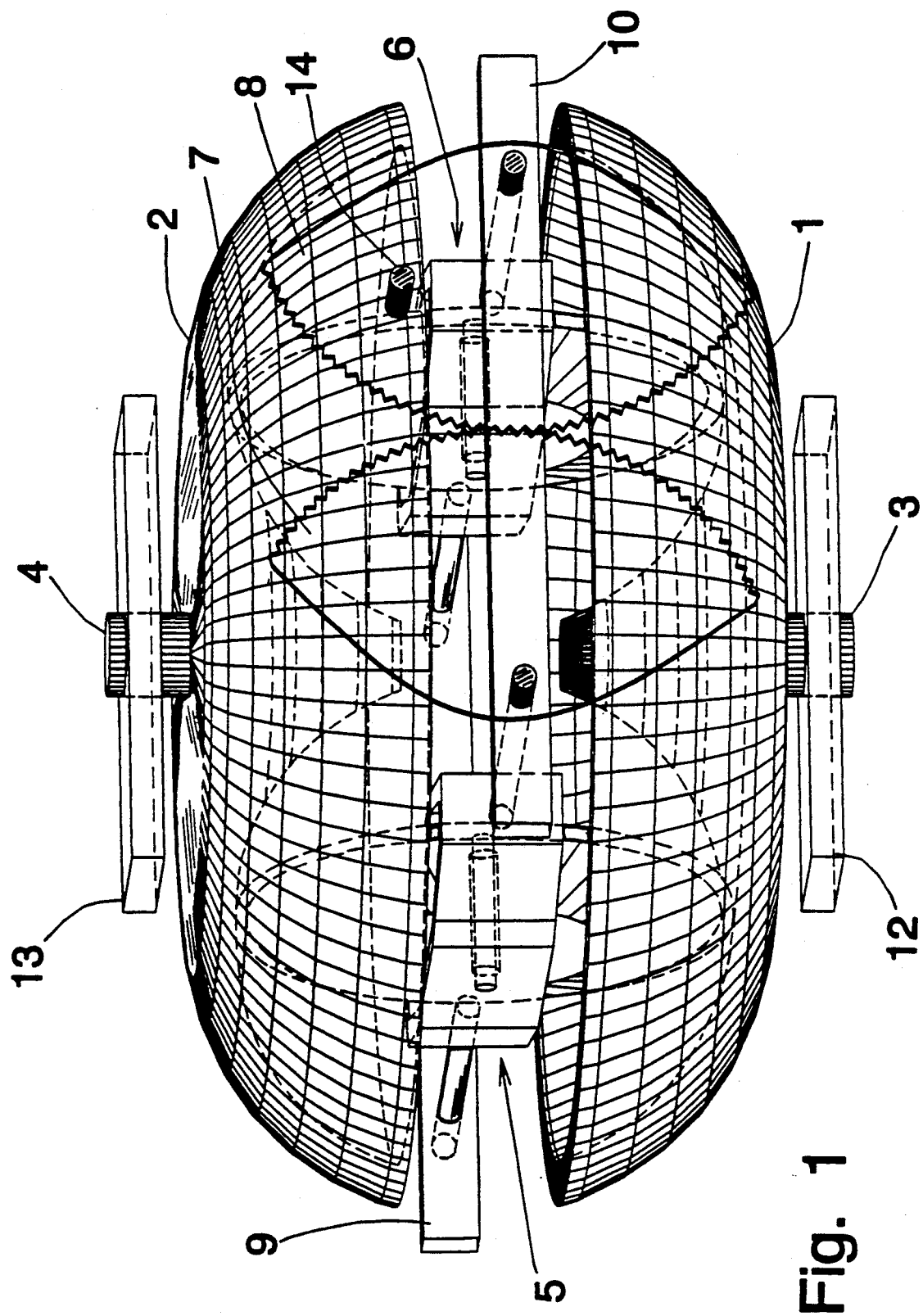
FIG. 1 is a perspective view of a preferred embodiment of the present invention.
Figure 2:
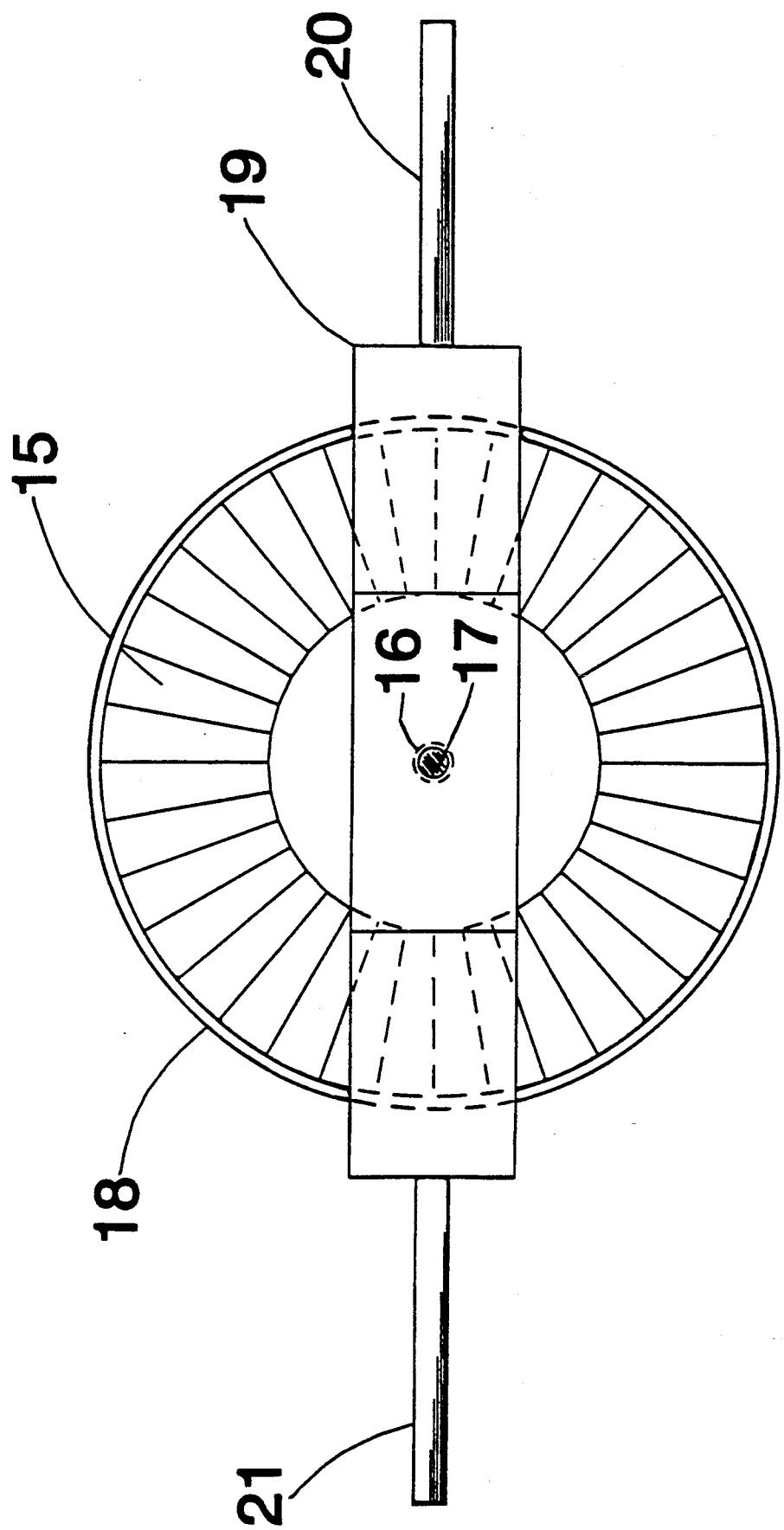
FIG. 2 is a side view of a pivoting drive wheel assembly.
Figure 3:
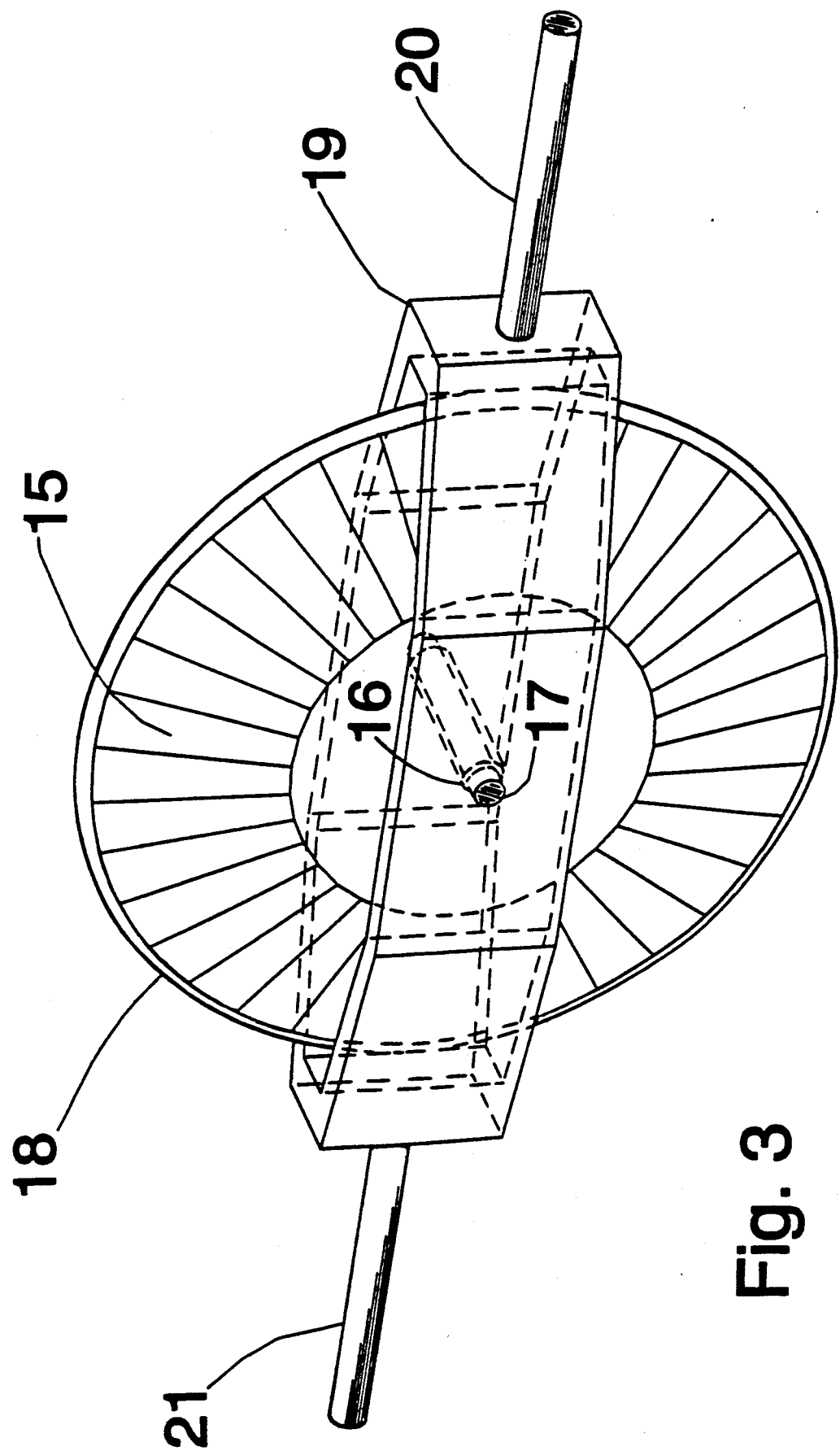
FIG. 3 is a perspective view of a pivoting drive wheel assembly.
Figure 4:
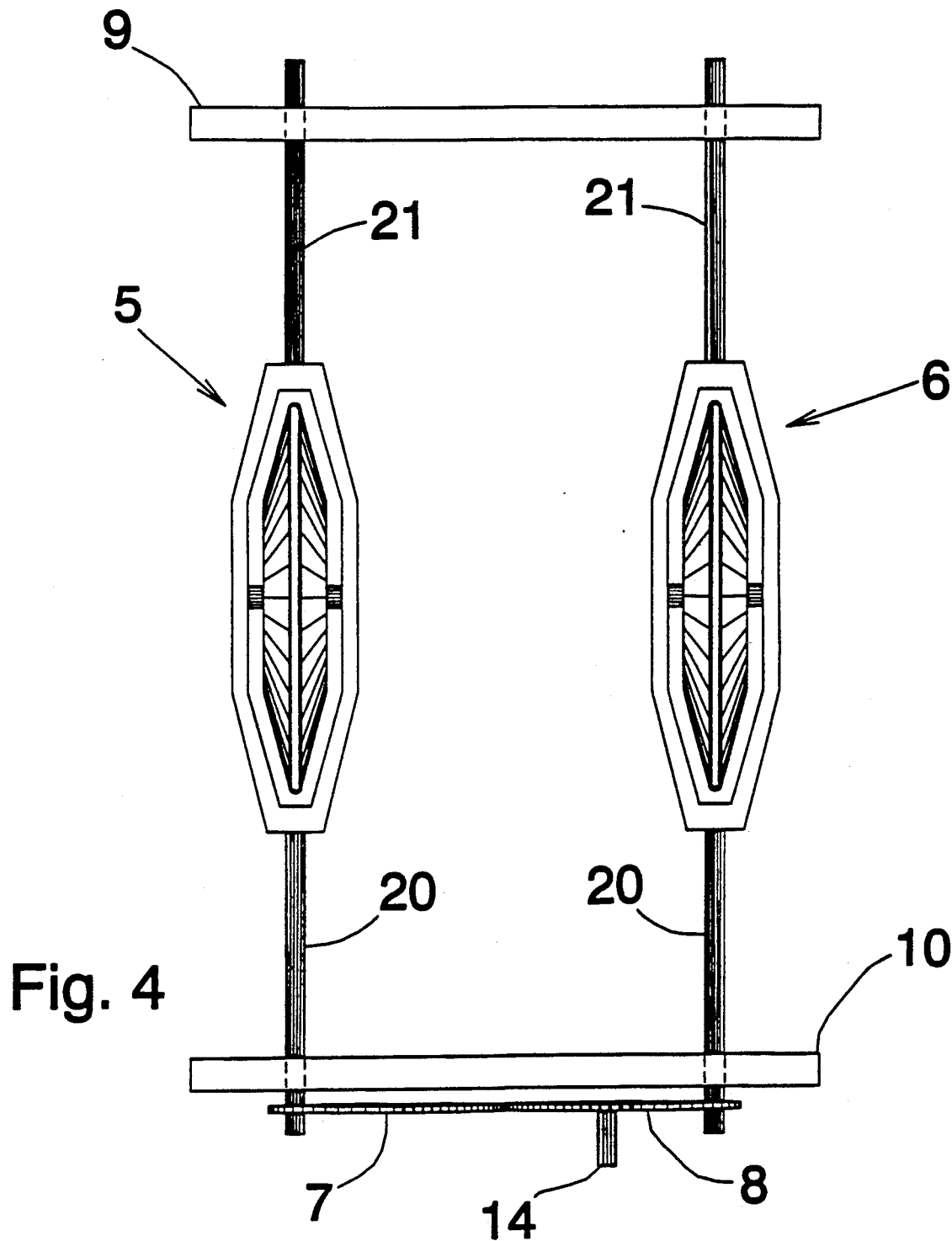
FIG. 4 is a top view of the invention viewed in FIG. 1, with toroidal races and driving and driven shafts removed for clarity.
Figure 5:
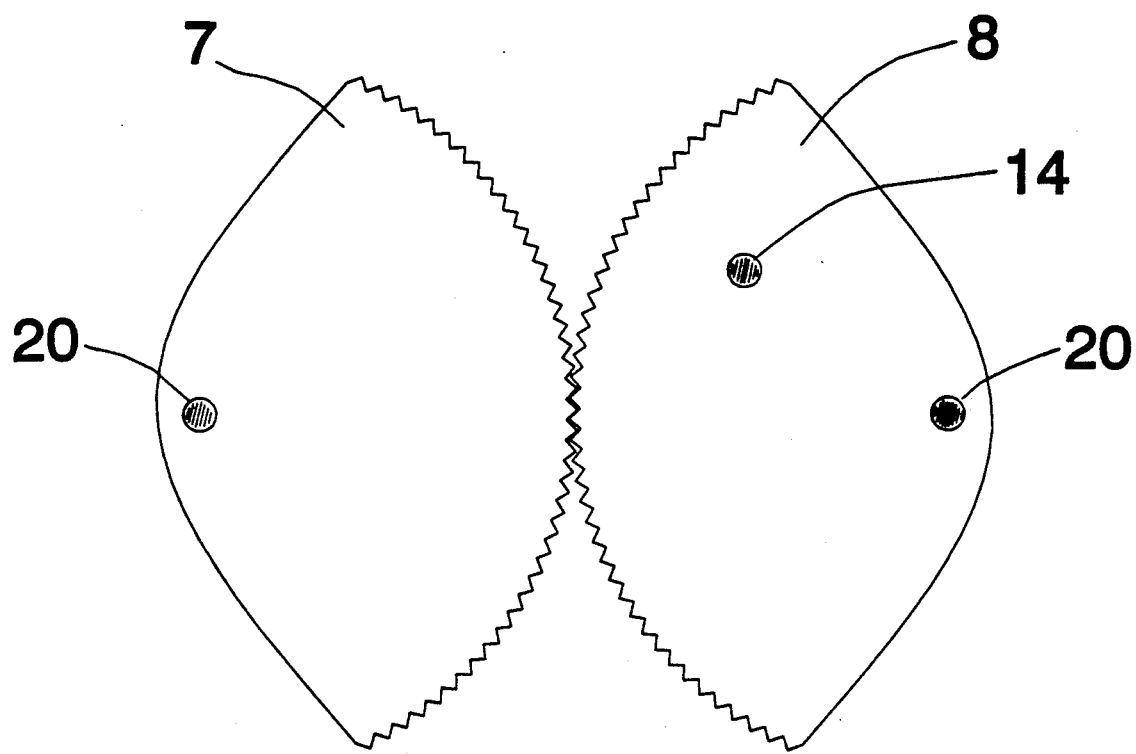
FIG. 5 is an isolated frontal view of the engaged semi-cogs viewed in FIG. 1.

Referring to FIG. 1, a driving shaft 3 is fixedly attached to a driving toroidal race 1, and a driven shaft 4 is fixedly attached to a driven toroidal race 2. The axes of rotation of said toroidal race 1 and said toroidal race 2 are the same, though the rotation of each will be in opposite orientation to one another. For example, if said driving toroidal race 1 is viewed as rotating in a clockwise direction, then said driven toroidal race 2 will be viewed as rotating in a counter-clockwise direction. Note that in FIGS. 6-8, the mounting structures have been removed from view so as to aid discussion. Also, as seen for example in FIG. 4, a left pivoting drive wheel assembly 5 and a right pivoting drive wheel assembly 6 can each be best referred to, for purposes of clarity, by components as seen in FIG. 2 and FIG. 3. That is, each said pivoting drive wheel assembly 5 and 6 is comprised of a drive wheel 15, a frictional ring 18, a sleeve 16 with a fitted axle 17 or other rotatable means permitting drive wheel 15 rotation, said axle 17 held in place by a holding frame 19 fixedly attached to a control shaft 20 and a control shaft 21. Referring back to FIG. 1, since said control shafts 20 and 21, attached to said pivoting drive wheel assemblies 5 and 6, are also rotatably attached to mounting structures 9 and 10, it is obvious that together said drive wheel assemblies 5 and 6 are able to rotate or pivot within said mounting structures 9 and 10.

Figure 6:
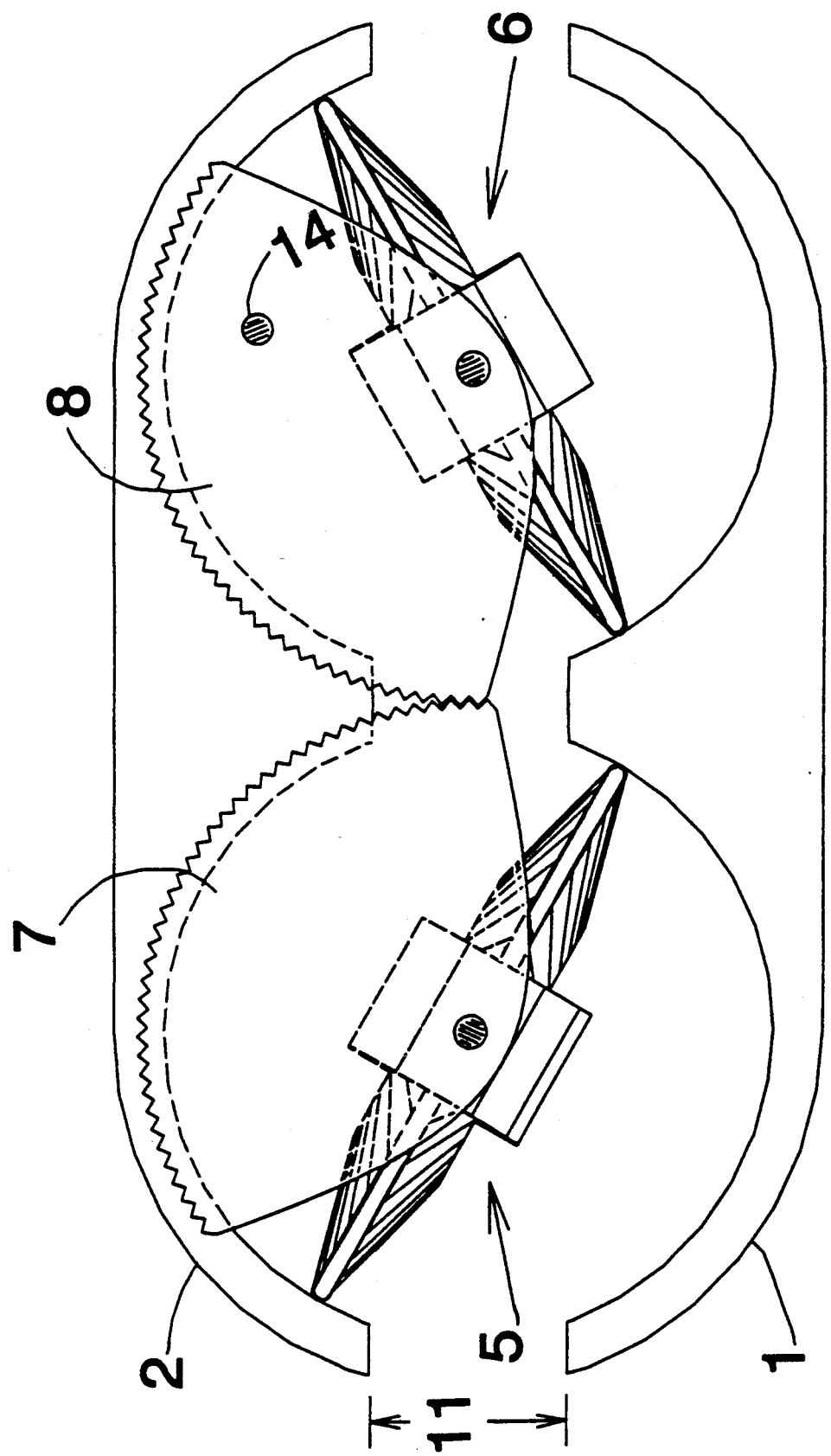
FIG. 6 is a frontal conceptual view of the invention showing a possible low drive ratio.

In FIG. 6, it can be seen that if a gap 11 was completely closed due to the extension of the toroidal races 1 and 2, the toroidal races would fully encompass a circular cylinder (a torus). Said gap 11, however, is provided to allow for the mounting and pivoting ability of said pivoting drive wheel assemblies 5 and 6. As seen in FIG. 1, said driving shaft 3 and said driven shaft 4 are rotatably attached to a support structure 12 and a support structure 13 respectively so as to maintain proper spacing for positioning said pivoting drive wheel assemblies 5 and 6.

In operation, the lowest of the range of available drive ratios occurs where each of the said drive wheel assemblies 5 and 6 is positioned so as to contact the apex, or smallest operational diameter, of said driving toroidal race 1, and concurrently the opposite side of each respective drive wheel assembly 5 and 6 contacts at the base, or largest operational diameter, of the driven toroidal race 2. The highest of the range of available drive ratios occurs where each of the drive wheel assemblies 5 and 6 is pivoted so as to contact the apex, or smallest operational diameter, of said driven toroidal race 2, and concurrently the opposite side of each respective drive wheel assembly 5 and 6 contacts at the base, or largest operational diameter, of said driving toroidal race 1. Referring to FIG. 1, a semi-cog 7 and a semi-cog 8, essentially partial gears fixedly attached at their rotational center to said control shafts 20 of said drive wheel assemblies 5 and 6 respectively, mesh together to serve as a guidance device, controlling the mutual pivoting of drive wheel assemblies 5 and 6 so as to ensure identical drive ratio positioning. A control lever 14, fixedly attached to said semi-cog 8, is situated so as to permit control of pivoting of the drive wheels. The precise shape of said semi-cogs 7 and 8 are shown for principle and demonstration only and are not intended to be strictly limiting. As situated in FIG. 1 and FIG. 8, this embodiment of the power transmission device would provide approximately a 1:1 drive ratio. Referring to FIG. 6, said pivoting drive wheel assemblies 5 and 6 are pivoted to a lower drive ratio, where each revolution of said driving toroidal race 1 results in relatively fewer revolutions of the driven toroidal race 2.

Figure 7:
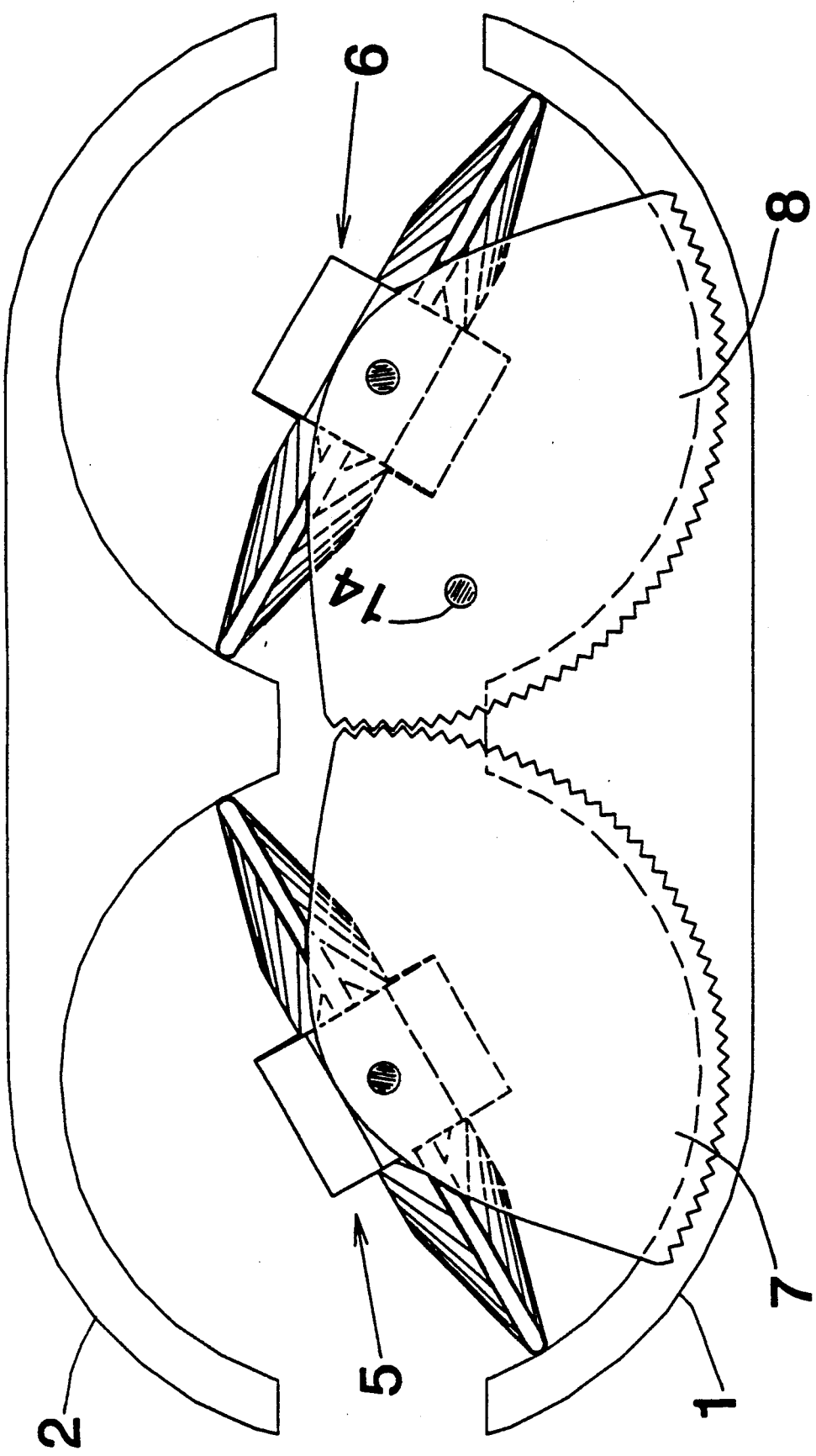
FIG. 7 is a frontal conceptual view of the invention showing a possible high drive ratio.
Figure 8:
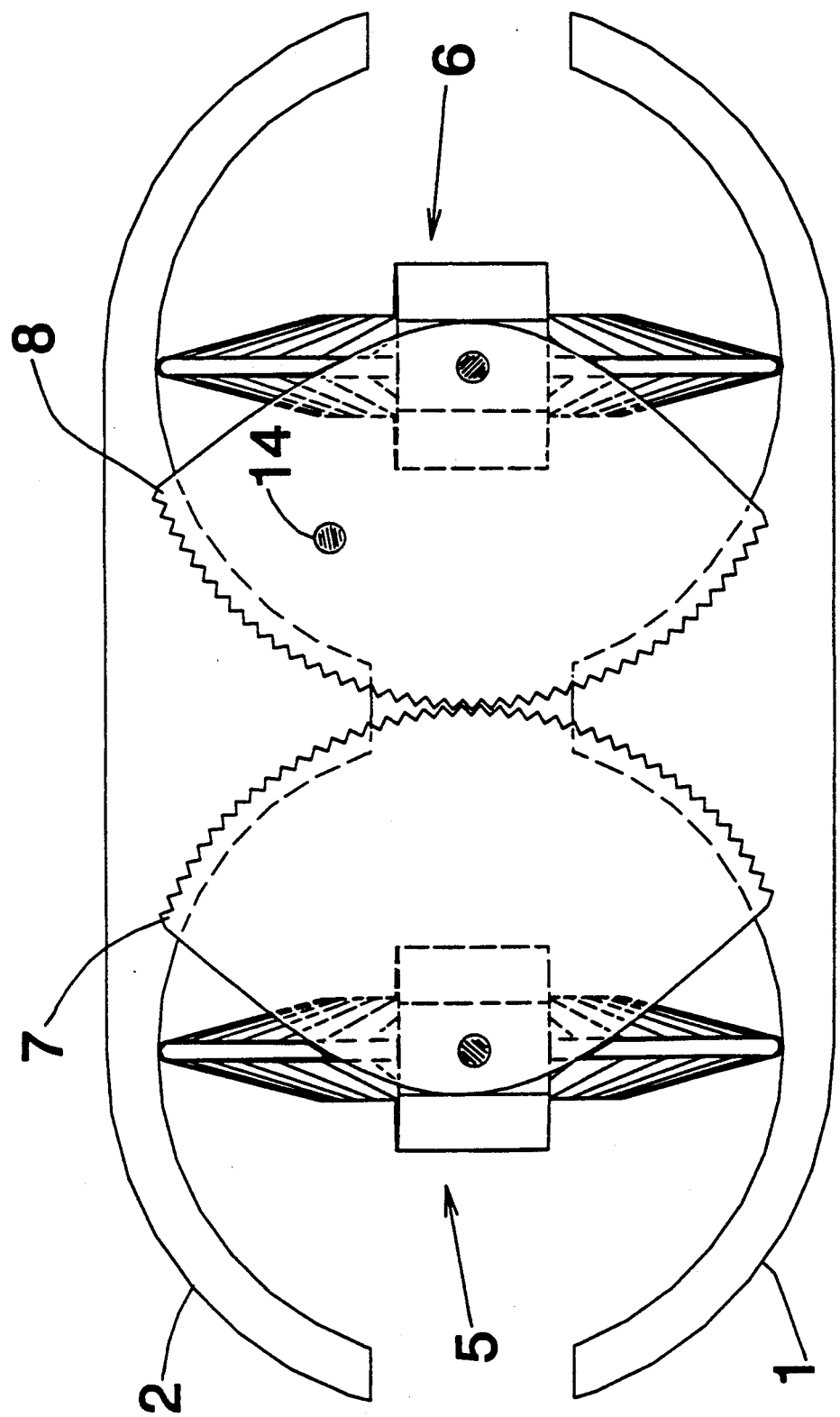
FIG. 8 is a frontal conceptual view of the invention showing an approximate 1:1 drive ratio.

Referring to FIG. 7, said pivoting drive wheel assemblies 5 and 6 are pivoted to a higher drive ratio, where each revolution of said driving toroidal race 1 results in relatively more revolutions of said driven toroidal race 2. A continuous and infinite selection of drive ratios is available within the available drive ratio range. The exact range of available drive ratios depends in part on the overall dimensions of the driving and driven toroidal races 1 and 2.

Operation of this embodiment in FIG. 1 involves the rotation of said driving shaft 3 and hence rotation of said driving toroidal race 1, which simultaneously transfers rotational energy to the drive wheels of said pivoting drive wheel assemblies 5 and 6, said drive wheels in turn simultaneously transferring rotational energy to said driven toroidal race 2 and hence to said driven shaft 4. Simultaneous pivoting of the drive wheels, of course, allows selection of any drive ratio within the available range. Such pivoting is implemented with the movement of said control lever 14, and identical drive ratio positioning of the drive wheels is ensured by mutual rotation of said engaged semi-cogs 7 and 8.

Of course, there are many different sizes and dimensions that could be used for toroidal races and drive wheels, and the examples in this teaching are not intended to limit such sizes and dimensions. Using scaleless units, and assuming that the driving toroidal race and the driven toroidal race are each identical in dimensions, it is possible that the circumference of the apex, or smallest operational cross-section, could be approximately 0.785 units, while a corresponding circumference of the base, or largest operational cross-section, could be approximately 56.549 units. Such dimensions would provide for an available input/output drive ratio range from a low of approximately 1:0.014 to a high of approximately 1:72. It is also possible that the circumference of the apex, or smallest operational cross-section, could be approximately 0.393 units, while a corresponding circumference of the base, or largest operational cross-section, could be approximately 3.142 units. Such dimensions would provide for an available input/output drive ratio range from a low of approximately 1:0.125 to a high of approximately 1:8. Again, the exact range of available drive ratios depends on the overall dimensions of the driving and driven toroidal races 1 and 2 and the corresponding matching drive wheel size.

SUMMARY, RAMIFICATIONS AND SCOPE

The foregoing describes a power transmission system that provides a continuous and infinite selection of drive ratios through the use of a driving toroidal race, pivoting drive wheel assemblies, a driven toroidal race, and controlling engaged semi-cogs. The present invention meets the aforementioned objectives as follows. The present invention provides continuous infinite-ratio power transmission in a device that is simple in construction, easy to maintain and relatively light in weight. The present invention allows drive ratios to be changed rapidly and smoothly. The present invention provides the ability to choose continuously from an infinite selection of drive ratios, within an extremely wide range of drive ratios, and offers an opportunity to precisely control input versus output rotational speeds for optimal energy and power efficiency. Further, the present invention controls drive wheel pivoting in a manner that reduces the complexity and bulkiness of toroidal-type transmissions.

As demonstrated in this discussion, the present invention is extremely versatile in design and use.

The foregoing description of the invention has been presented for the purposes of illustration and description. It is not intended to be exhaustive or to limit the invention to the precise forms disclosed. Many modifications and variations are possible in light of the above teaching. For example, using FIGS. 1 and 2 for reference to components:

The control lever 14, of course, could be attached at any one of many areas on semi-cogs 7 or 8, as well as on a control shaft 20 or control shaft 21.

The mounting structures are shown only for purposes of demonstration, and in fact the exact form and location of the mounting structures are dependent on each specific use and form of the transmission device.

The drive wheel is provided with a frictional surface on the circumference portion thereof. The frictional ring 18 of drive wheel 15 could be replaced by a frictional surface or even a drive wheel 15 entirely composed of a friction-providing material, the main point being that some degree of friction is required between the drive wheel 15 and the toroidal races 1 and 2. An advantage of the frictional ring 18 as described in the preferred embodiment is that it could be readily replaceable, especially when the friction ring 18 is partially embedded within a matching groove around the circumference of the drive wheel 15.

Thus it can be seen that the present invention can be utilized in many different manners. The principle, however, remains the same, in that toroidal races are used as the source of an infinite selection of drive ratios, and a manner for conveying rotational energy such as pivoting drive wheel assemblies 5 and 6 provide for a continuous transition among the drive ratios, control of said pivoting drive wheel assemblies 5 and 6 being provided by attached and engaged gears or partial gears such as semi-cogs 7 and 8.

It is intended that the scope of the invention be limited not by this detailed description, but rather by the claims appended hereto.

I claim:

1. A toroidal-type transmission, comprising:
   a. a driving toroidal race,
   b. a driven toroidal race,
   c. a plurality of pivoting drive wheel assemblies each further comprised in part of a rotating drive wheel supported by a holding frame,
   d. a pair of engaged semi-cogs,
   e. a means for control of rotation of said semi-cogs, each said pivoting drive wheel assembly further comprised of and supported by a pair of rotatable control shafts, said drive wheel assemblies further supported between, and mutually contacting, said driving toroidal race and said driven toroidal race, said engaged semi-cogs fixedly attached to a respective said control shaft of each said drive wheel assembly, whereby,
      rotation of said driving toroidal race simultaneously transfers rotational movement through said rotating drive wheels to said driven toroidal race, wherein rotation of said semi-cogs controls the mutual pivoting of said drive wheel assemblies, said pivoting providing for the continuous selection of desired drive ratios.

2. A toroidal-type transmission as defined in claim 1, wherein said means for control of rotation of said semi-cogs is comprised of a control lever fixedly attached to either of said semi-cogs.

3. A toroidal-type transmission as defined in claim 1, wherein said driving toroidal race and said driven toroidal race are extended so as to nearly close the gap between each other, said gap sufficiently wide to permit rotatable support of said drive wheel assemblies with said control shafts.

4. A toroidal-type transmission as defined in claim 1, wherein said engaged semi-cogs are fixedly attached to said control shafts external to the toroidal void created by said driving and driven toroidal races.

5. A drive ratio control mechanism in a toroidal-type transmission comprised of a plurality of semi-cogs, each said semi-cog fixedly attached to a respective control shaft of a respective pivoting drive wheel assembly, each said semi-cog engaged with the other and mutually rotatable, whereby,
   rotation of either semi-cog causes mutual pivoting of said drive wheel assemblies for selection of a desired drive ratio.

6. A drive ratio control mechanism in a toroidal-type transmission as defined in claim 5, wherein said means for rotation of said semi-cogs is comprised of a control lever fixedly attached to either of said semi-cogs.

7. A drive ratio control mechanism in a toroidal-type transmission as defined in claim 5, wherein said engaged semi-cogs are fixedly attached to said control shafts external to the toroidal void created by said toroidal-type transmission.

* * * * *